US009642378B2

(12) United States Patent
Van Hillo et al.

(10) Patent No.: US 9,642,378 B2
(45) Date of Patent: May 9, 2017

(54) DEVICE AND METHOD FOR REMOVING ABDOMINAL FAT FROM ABDOMINAL SKIN OF A SLAUGHTERED BIRD SUSPENDED BY THE LEGS

(71) Applicant: Meyn Food Processing Technology B.V.

(72) Inventors: Eric Adriaan Van Hillo, Oostzaan (NL); Jan Willem Hagendoorn, Oostzaan (NL); Hermanus Laurentius Zomerdijk, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/277,230

(22) Filed: Sep. 27, 2016

(65) Prior Publication Data

US 2017/0086468 A1 Mar. 30, 2017

(30) Foreign Application Priority Data

Sep. 28, 2015 (NL) ..................... 2015513

(51) Int. Cl.
*A22C 21/00* (2006.01)
*A22C 21/06* (2006.01)

(52) U.S. Cl.
CPC .................. *A22C 21/06* (2013.01)

(58) Field of Classification Search
CPC ... A22B 5/0029; A22B 5/0017; A22B 5/0041; A22B 5/20; A22B 5/203; A22C 17/006; A22C 17/004; A22C 21/00; A22C 21/06

USPC ........ 452/134, 136, 153–157, 148–151, 160, 452/166, 170
See application file for complete search history.

(56) References Cited

U.S. PATENT DOCUMENTS

| 4,265,001 | A | * | 5/1981 | Hathorn | A22C 21/06 452/120 |
| 4,283,813 | A | * | 8/1981 | House | A22C 21/0053 452/106 |
| 4,516,290 | A | * | 5/1985 | van Mil | A22C 21/06 452/118 |
| 4,776,063 | A | * | 10/1988 | Tieleman | A22C 21/06 452/134 |
| 5,135,431 | A | | 8/1992 | van den Nieuwelaar | |
| 5,707,280 | A | * | 1/1998 | Tieleman | A22C 21/06 452/117 |
| 6,398,636 | B1 | * | 6/2002 | Jansen | A22B 5/0094 452/120 |
| 7,537,515 | B2 | * | 5/2009 | Chattin | A22C 21/06 452/119 |
| 2002/0155802 | A1 | * | 10/2002 | Sorenson | A22C 21/0023 452/120 |
| 2002/0173261 | A1 | * | 11/2002 | Gooren | A22C 21/06 452/134 |
| 2002/0177396 | A1 | | 11/2002 | van den Nieuwelaar | |

(Continued)

*Primary Examiner* — Richard Price, Jr.
(74) *Attorney, Agent, or Firm* — Dority & Manning, P.A.

(57) ABSTRACT

A device and method for removing abdominal fat from abdominal skin of a slaughtered bird suspended by the legs. A scraping tool having a first vertically movable part and a second vertically movable part that is tiltable towards the first part, wherein the first part and the second part are arranged to execute a concerted operation in an abdominal cavity of the slaughtered bird for removal of the abdominal fat from the bird.

10 Claims, 10 Drawing Sheets

(56) References Cited

U.S. PATENT DOCUMENTS

| | | | |
|---|---|---|---|
| 2005/0037704 A1* | 2/2005 | Heer | A22C 21/06 452/150 |
| 2005/0186895 A1* | 8/2005 | Winkelmolen | A22C 21/06 452/117 |
| 2009/0042497 A1 | 2/2009 | Sorensen | |
| 2015/0257395 A1* | 9/2015 | Van Hillo | A22B 1/00 452/53 |

* cited by examiner

DEVICE AND METHOD FOR REMOVING ABDOMINAL FAT FROM ABDOMINAL SKIN OF A SLAUGHTERED BIRD SUSPENDED BY THE LEGS

PRIORITY STATEMENT

The present application claims priority under 35 U.S.C. §119 to Dutch Application No. 2015513, filed Sep. 28, 2015.

FIELD OF THE INVENTION

The subject matter of the present disclosure relates generally to a device and method for removing abdominal fat from abdominal skin of a slaughtered poultry.

BACKGROUND OF THE INVENTION

A method and device for removing fat from abdominal skin of a slaughtered poultry are indicated in EP-A-1 248 524. Therein, a scraper and a support that are both vertically movable are inserted into the abdominal cavity of the slaughtered bird. The bird is fixed in position with a pivotable pin that is also introduced in the abdominal cavity of the slaughtered bird. The scraper has a central aperture and is moved, after its insertion into the bird, towards the support in order to catch the abdominal fat in the central aperture, and then the scraper is moved alongside a surface of the support to remove the abdominal fat from the slaughtered bird while the support remains stationary in the bird. In an alternative embodiment, the scraper and the support can be moved together to leave the poultry's cavity with the abdominal fat. This operation can be carried out serially on a number of birds moving in either a carousel machine or in a straight processing line, which is currently common in poultry processing in order to be able to meet high production rates. Likewise, the device and method of the invention are preferably to be carried out in combination with a carousel machine or in a straight processing line, for which reason the slaughtered bird is suspended by the legs, normally using for this purpose a series of chained carriers that are moved along a conveyor track.

SUMMARY OF THE INVENTION

A device and method are provided for removing abdominal fat from abdominal skin of a slaughtered bird suspended by the legs. In one exemplary aspect, the device includes a scraping tool having a first vertically movable part and a second vertically movable part that is tiltable towards the first part. The first part and the second part are arranged to execute a concerted operation in an abdominal cavity of the slaughtered bird for removal of the abdominal fat from the bird. The first vertically movable part and the second vertically movable part are arranged to clamp the abdominal skin with the abdominal fat in between the parts. The device is arranged to remove thereafter the first movable part and the second movable part together from the abdominal cavity of the bird to detach the abdominal fat from the abdominal skin. Additional aspects and advantages of the invention will be set forth in part in the following description, or may be obvious from the description, or may be learned through practice of the invention.

In one exemplary aspect, it is an object of the invention to simplify the conventional or known method and device.

In still another exemplary aspect, it is another object of the invention to improve the yield in harvesting abdominal fat from the slaughtered poultry.

In still another exemplary aspect, it is another object of the invention to provide an alternative to the known device which more reliably can harvest the abdominal fat from the poultry.

These and other objects of the invention which will become apparent from the following disclosure are provided by a method and device according to the features of one or more of the appended claims.

In a first exemplary aspect of the invention, the first vertically movable part and the second vertically movable part are arranged to clamp the abdominal skin with the abdominal fat in between the parts. The device is arranged to remove the first movable part and the second movable part thereafter together from the abdominal cavity of the bird to detach the abdominal fat from the abdominal skin. The first movable part and the second movable part are removed from the bird in unison—i.e. with the same speed. With such an exemplary device of the invention working according to the exemplary method of the invention, harvesting of the abdominal fat residing on the abdominal skin of the slaughtered poultry can be effectively realized with high yield.

The second vertically movable part is tilted towards the first vertically movable part so as to clamp the abdominal skin with the abdominal fat in between the first part and the second part. The first movable part and the second movable part are subsequently removed in unison—i.e. with the same speed from the abdominal cavity of the bird to detach the abdominal fat from the abdominal skin.

It is preferable that the device of the invention is embodied with the feature that the first vertically movable part and the second vertically movable part are arranged to clamp the abdominal skin with the abdominal fat in between the parts to a pre-established limited extent, enabling that the abdominal skin still can move relative to the first part and the second part when a pulling force is applied to the skin caused by the skin being held back by the slaughtered bird during removal of the first part and second part from the abdominal cavity of the bird.

In one exemplary aspect, it is further preferable that the first vertically movable part is embodied with a central aperture and the second vertically movable part is dimensioned to loosely fit in the central aperture of the first part. This is a very suitable arrangement to clamp the abdominal skin with the abdominal fat in the play between the first movable part and the second movable part while the play secures the possibility that the abdominal skin can move relative to the first and second movable parts when it is pulled at.

More specifically, in an exemplary aspect, it is preferred that the first movable part is provided with a wall or walls delimiting an area defining a central aperture of the first movable part, and the second vertically movable part has a closed surface substantially matching the area of the central aperture of the first movable part leaving indeed some room of play between the first and second movable parts. This arrangement is further particularly suitable in a method according to an exemplary aspect of the invention wherein the second vertically movable part is tilted towards the first vertically movable part so that the wall or walls of the first movable part and the second vertically movable part together constitute a cup for receipt of abdominal fat when the abdominal skin with the abdominal fat is clamped between the first and second movable parts. Accordingly, the exemplary device of the invention is preferably constructed with the feature that the wall or walls of the first movable part and the second vertically movable part are dimensioned such that they together constitute a cup (albeit due to the mentioned play not with a watertight bottom) when the second vertically movable part is tilted towards the first vertically movable part for clamping the abdominal skin with the abdominal fat between the parts.

Optimal results are achieved by arranging that the central aperture of the first vertically movable part has an essentially rectangular shape, and the second vertically movable part has a corresponding rectangular shape that fits into the central aperture.

Finally, in another exemplary aspect, it is found beneficial that the device of the invention is provided with a centering and fixing bracket which is vertically movable, however without tilting capability. This provides a very simple solution to secure accuracy in the operation of the device and method of the invention.

The invention will hereinafter be further elucidated with reference to the drawings of an exemplary embodiment of a device and its exemplary method of operation according to the invention that is not limiting as to the appended claims. The above and other features, aspects and advantages of the present invention will become better understood with reference to the following description, appended claims, and accompanying drawings, which are incorporated in and constitute a part of this specification. The drawings illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features. Arrows with V indicate the vertical direction, and arrows with T indicate a transverse direction orthogonal to vertical direction V.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1A:
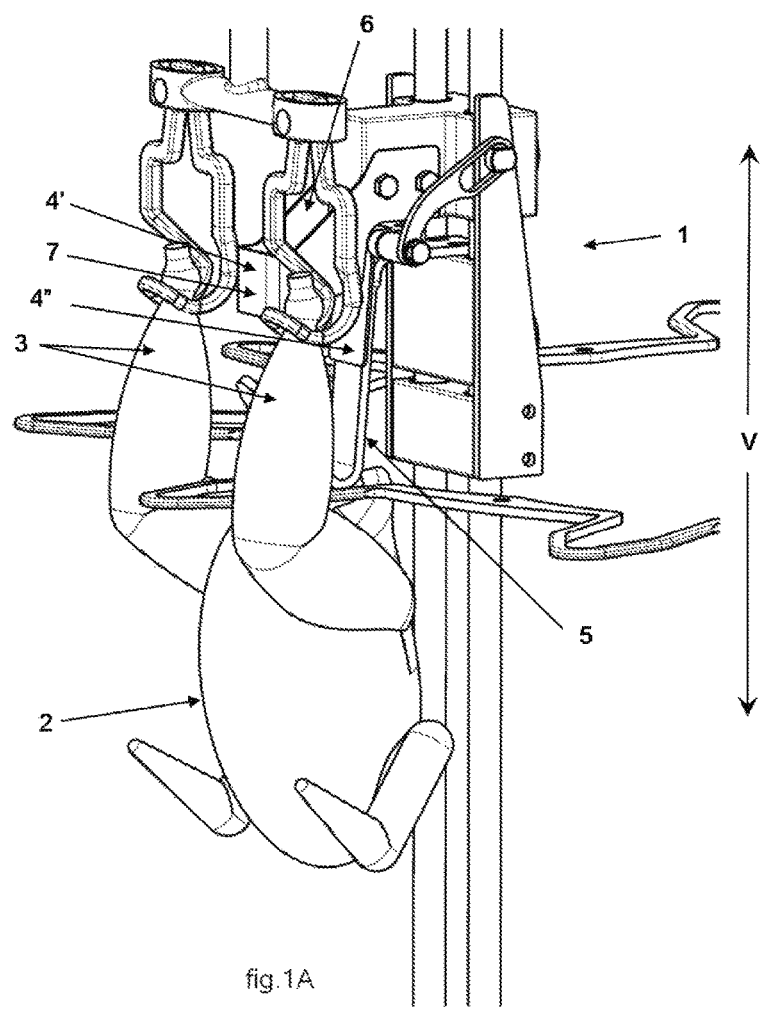
FIGS. 1A and 1B show a device according to an exemplary embodiment of the invention in isometric and side view respectively, together with a suspended bird wherein the device is shown immediately prior to becoming operational for removal of abdominal fat.
Figure 1B:
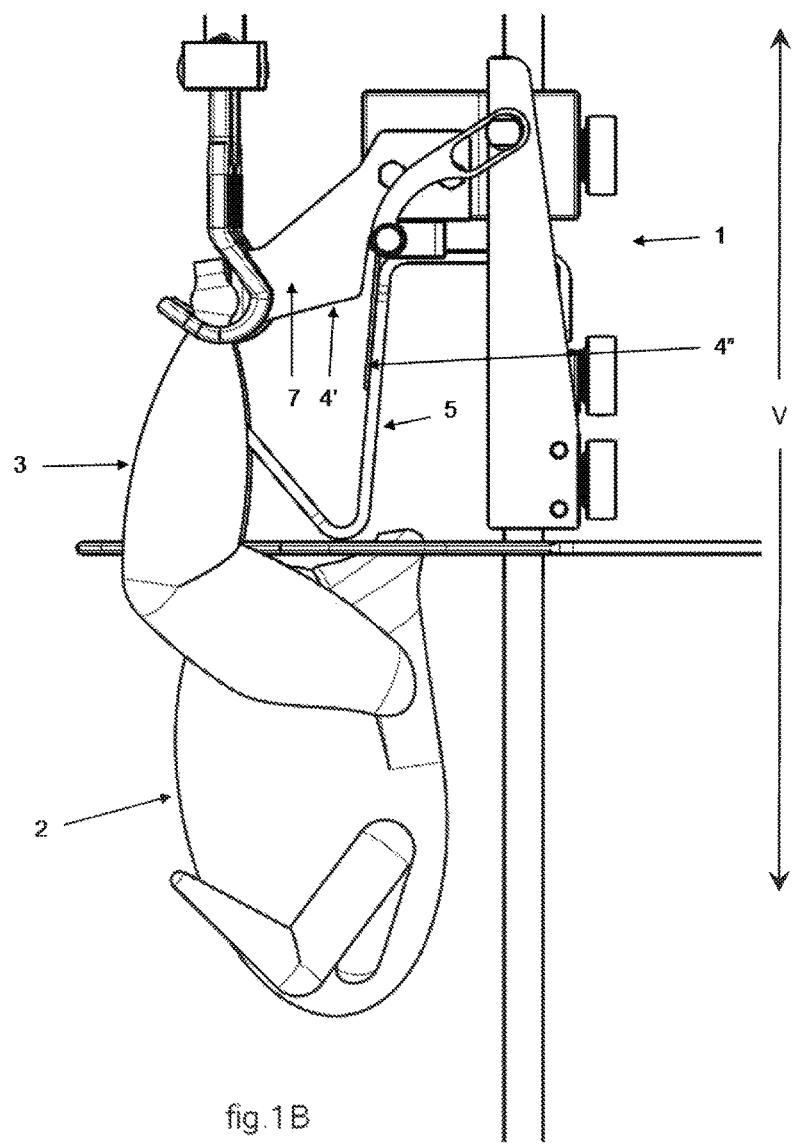

With reference to FIGS. 1A and 1B, an exemplary device of the invention is depicted with reference 1. The device 1 is used for removing abdominal fat from abdominal skin of a slaughtered poultry or bird 2 suspended by the legs 3. In this exemplary embodiment, the device 1 includes for that purpose a scraping tool 4', 4" having a first vertically movable part 4' and a second vertically movable part 4". The second vertically movable part 4" is tiltable towards the first movable part 4'. As will become clear from the following discussion with reference to FIGS. 2-4, the first part 4' and the second part 4" are arranged to execute a concerted operation in the abdominal cavity of the slaughtered bird 2 for removal of its abdominal fat residing on the abdominal skin of the bird 2.

Figure 2A:
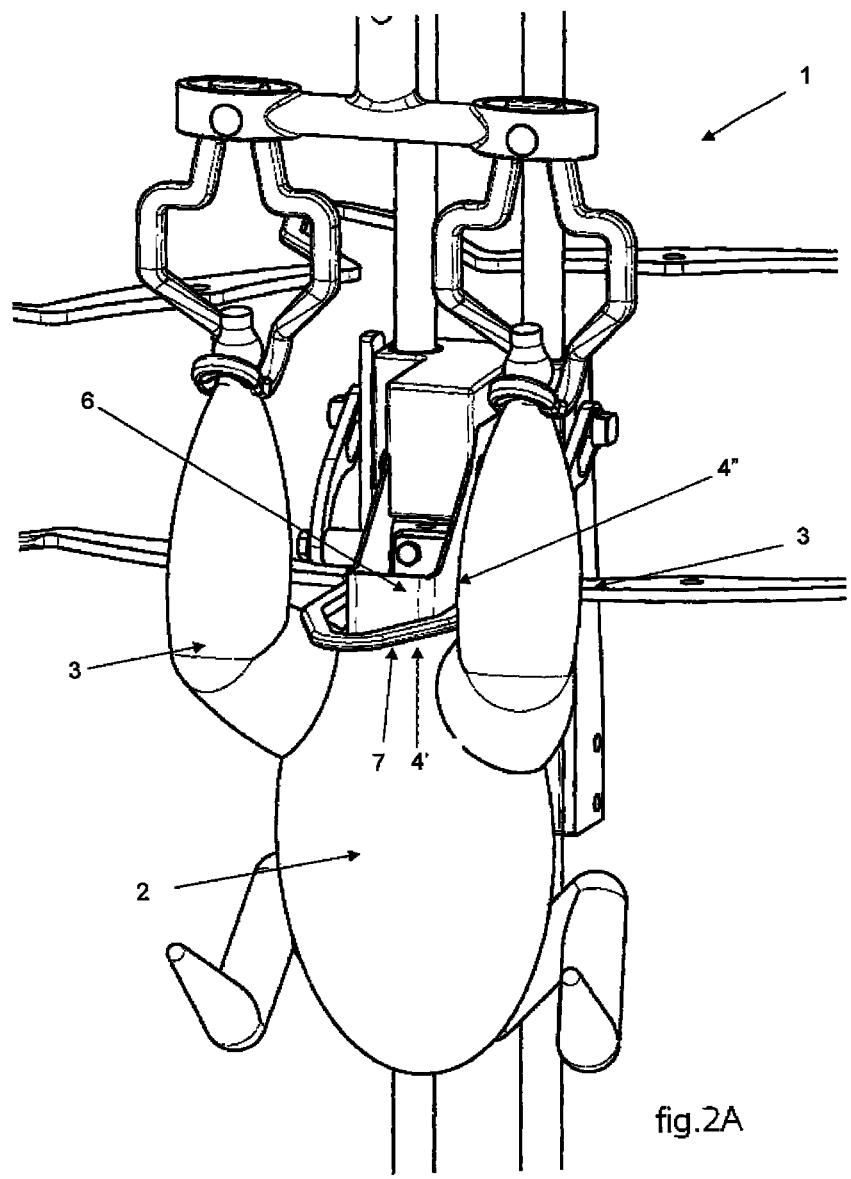
FIGS. 2A, 2B and 2C show the exemplary device of FIGS. 1A and 1B in, respectively, isometric view, side view and cross-sectional view, wherein parts of the device are introduced into the abdominal cavity of the bird.
Figure 2B:
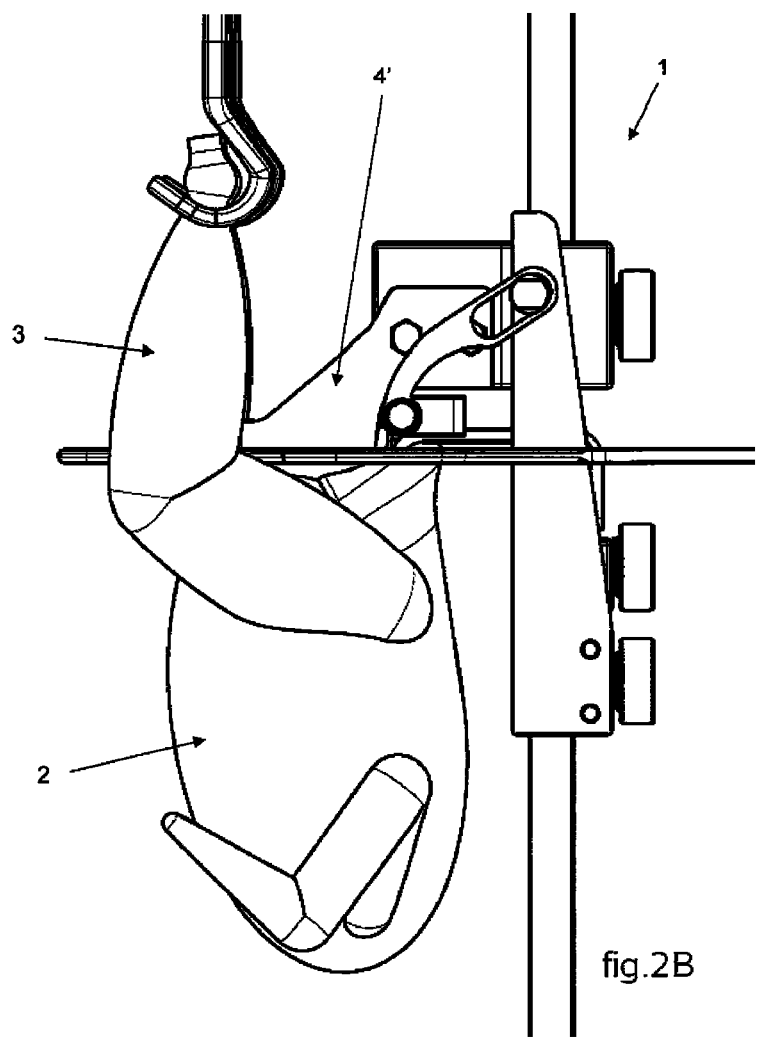
Figure 2C:
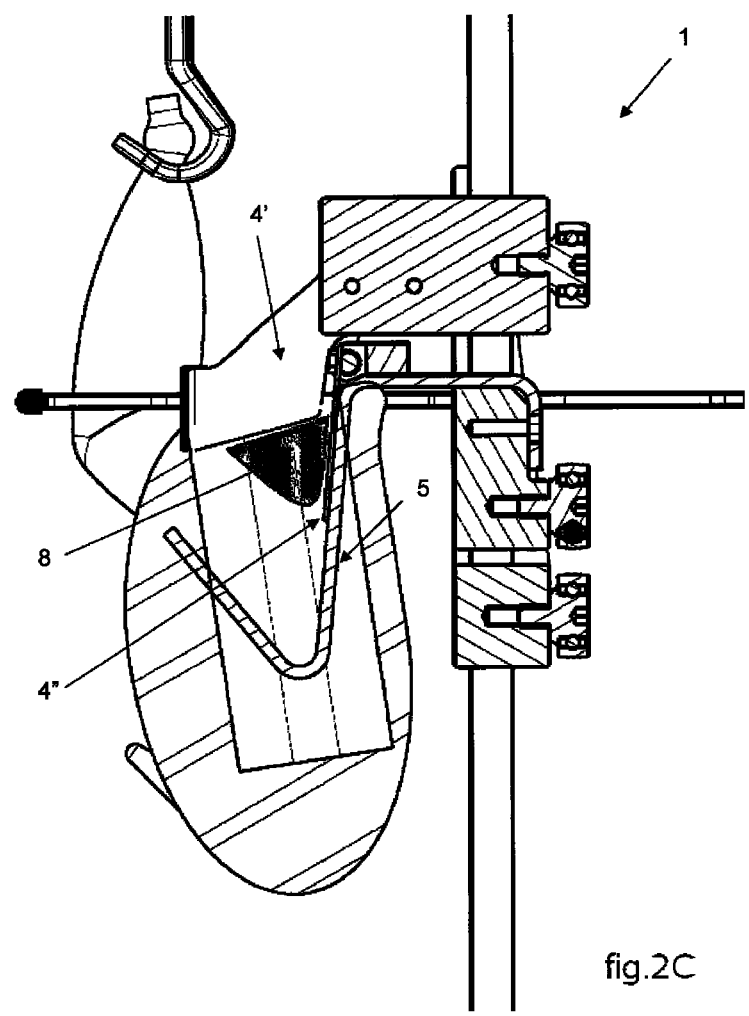

FIGS. 2A, 2B, and 2C show the device 1, wherein particular parts of the device are introduced into the abdominal cavity of the bird. This applies in particular to the first vertically movable part 4' and the second vertically movable part 4", but also to a centering and fixing bracket 5 (FIG. 2C) that is introduced into the abdominal cavity of the bird 2 together and simultaneously with the introduction of the first and the second parts 4', 4" of the device 1 into the abdominal cavity. To this end the centering and fixing bracket 5 is also vertically movable, yet can be arranged without tilting capability to provide a simple and reliable means of fixing the position of the bird 2 which is particularly important when the concerted operation of the first and the second parts 4', 4" of the device 1 in the abdominal cavity of the bird 2 is carried out.

In one exemplary aspect, an important advantage of the invention relates to the introduction of the first part 4' and the second part 4" of the device 1 into the abdominal cavity of the bird 2, wherein contrary to prior art solutions this introduction does not notably interfere with the abdominal fat 8 on the abdominal skin of the bird 2. This can in particular be seen in FIG. 2C wherein the introduction of the second part 4" into the abdominal cavity of the bird 2 makes this second part 4" pass along the abdominal fat 8 without notably touching it. At the same time, the first vertically movable part 4' remains completely above the abdominal fat 8. This exemplary aspect of the invention contributes to the effective subsequent removal of the abdominal fat 8 from the abdominal skin of the bird 2, wherein a high yield is achieved.

Figure 3A:
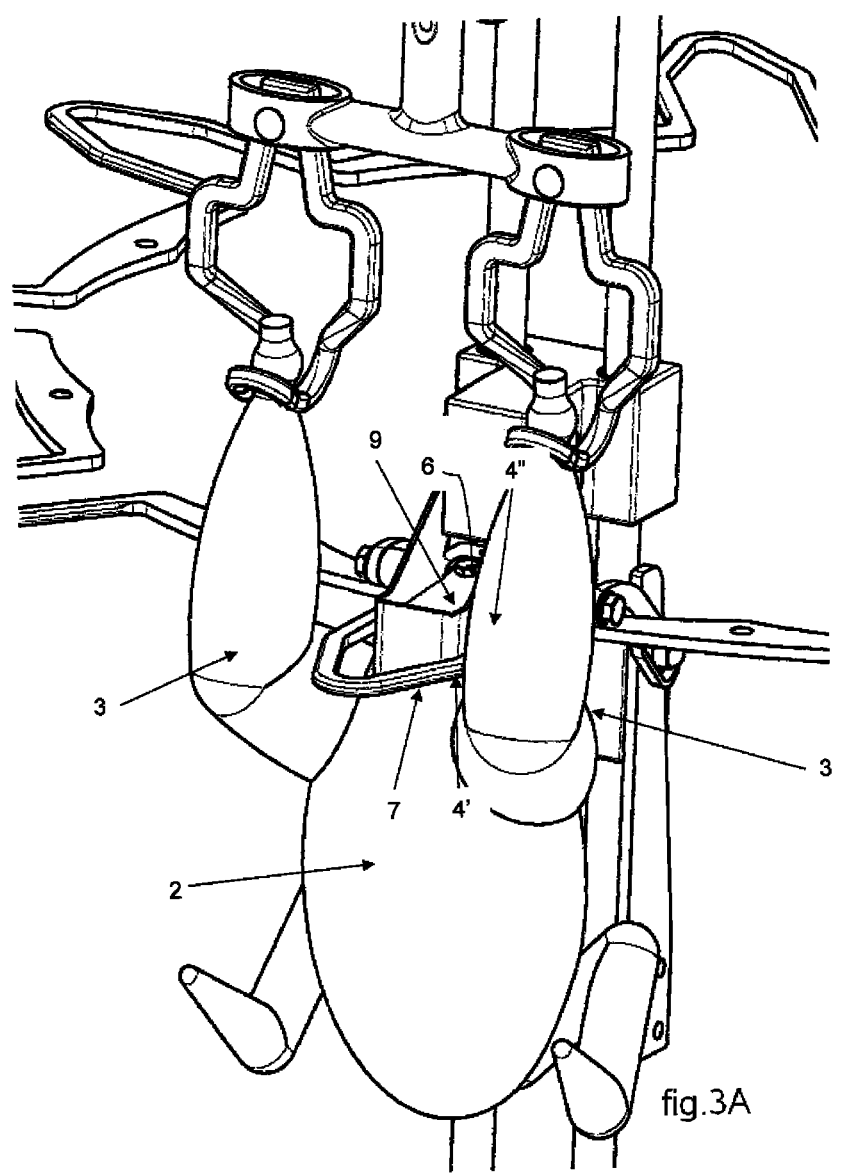
FIGS. 3A, 3B and 3C show the exemplary device of FIGS. 1A and 1B in, respectively, isometric view, side view and cross-sectional view, wherein first and second parts of the device that are introduced into the abdominal cavity of the bird are moved to a clamping position for clamping the abdominal skin with abdominal fat.
Figure 3B:
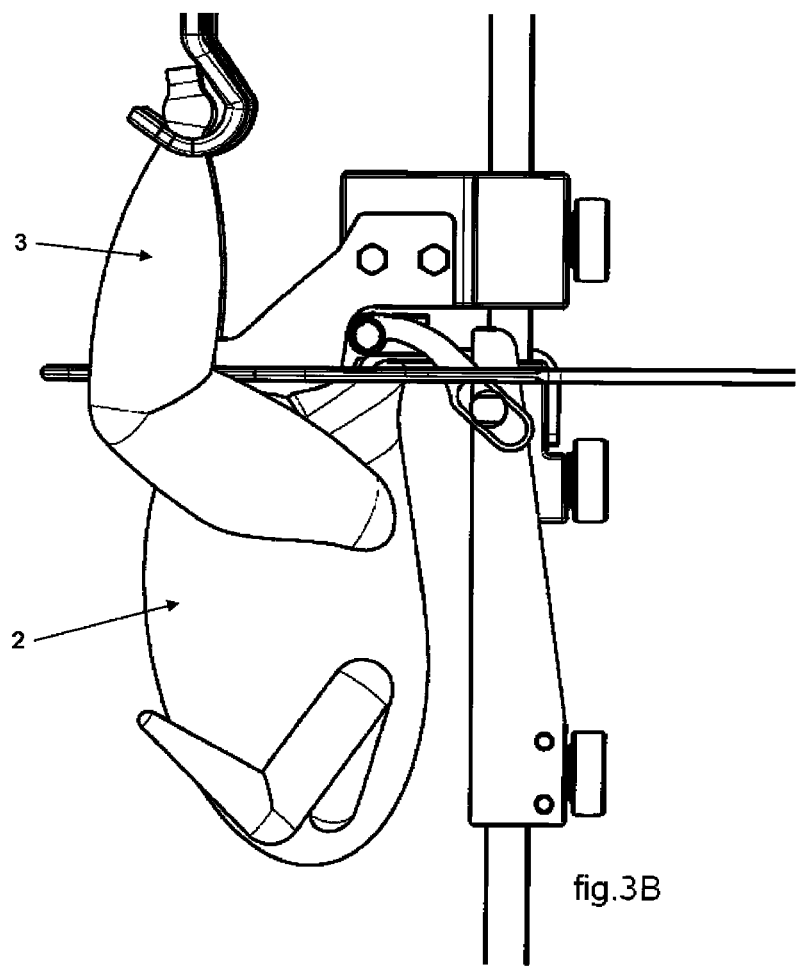
Figure 3C:
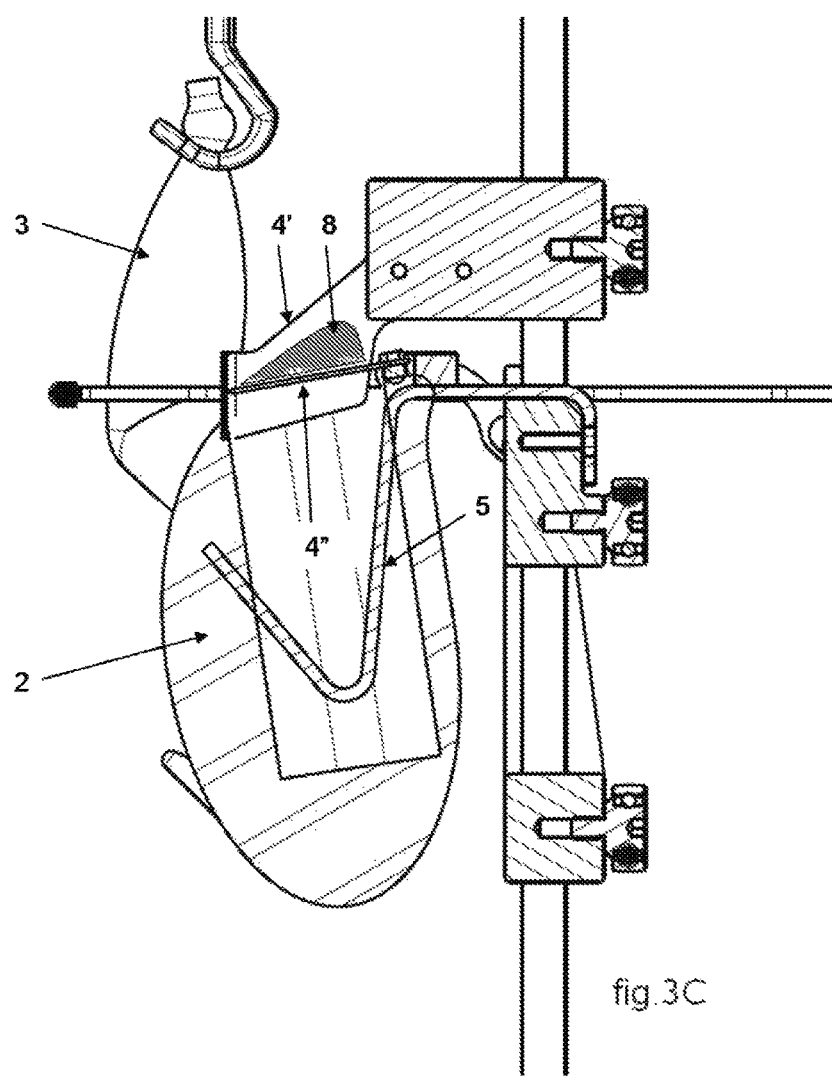
Figure 4A:
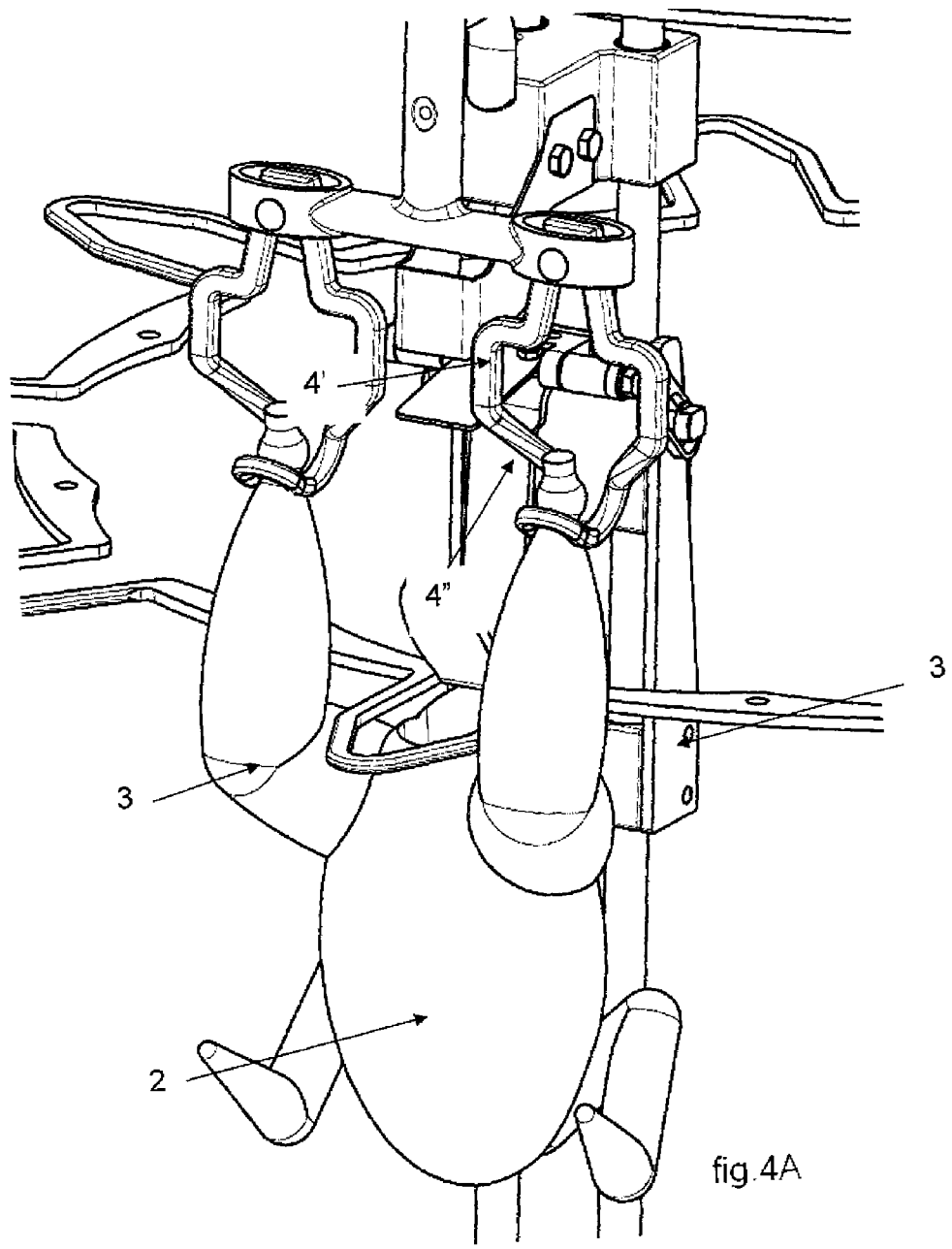
FIGS. 4A and 4B show the parts of the exemplary device of the invention that are earlier introduced into the abdominal cavity of the bird, now being removed therefrom in respectively an isometric view and in a side view.
Figure 4B:
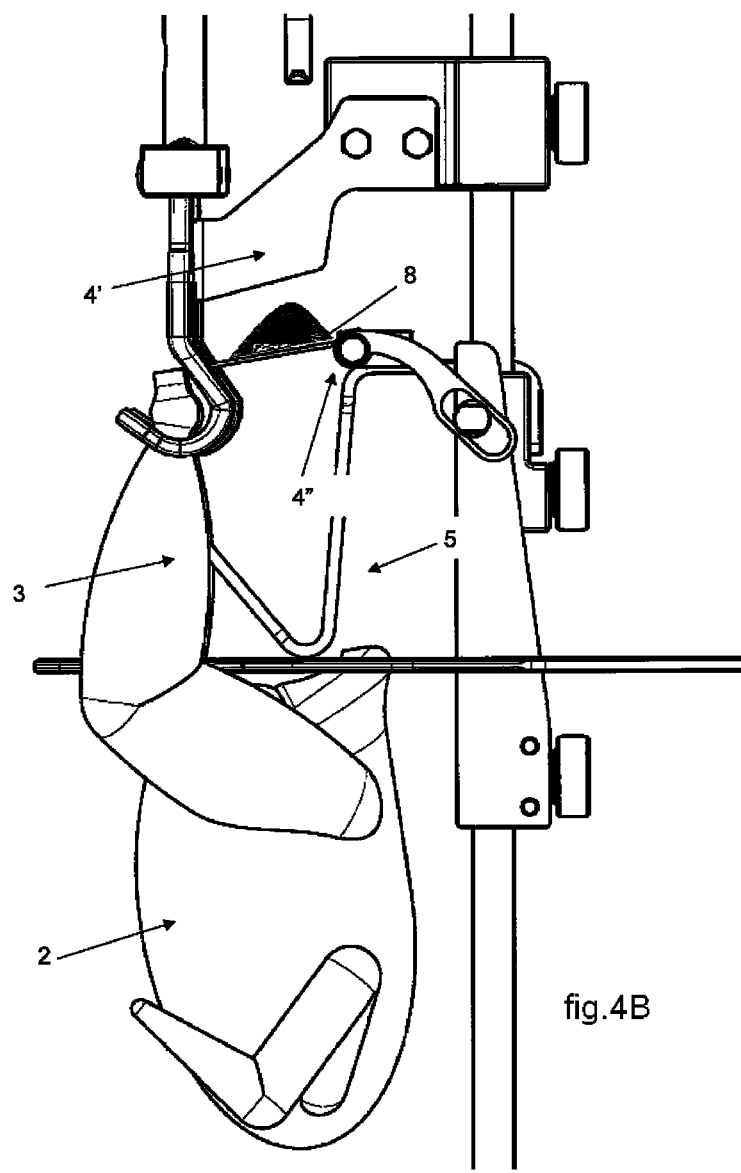

In FIGS. 3A, 3B and 3C it is shown that after the first and second parts 4', 4" of the device 1 are introduced into the abdominal cavity of the bird 2 the second movable part 4" is moved towards the first vertically movable part 4' to cause that these parts 4', 4" eventually clamp the abdominal skin with the abdominal fat in between the parts. According to what is shown in FIGS. 4A and 4B, the first movable part 4' and the second movable part 4" are then arranged to move together and preferably in unison to a position outside of the abdominal cavity of the bird 2, which causes the detachment of the abdominal fat 8 from the abdominal skin of the bird 2.

Preferably the first vertically movable part 4' and the second vertically movable part 4" are arranged to clamp the abdominal skin with the abdominal fat in between the parts 4', 4" to a pre-established limited extent enabling that the abdominal skin of the bird 2 still can move relative to the first part 4' and second part 4" of the device 1 clamping the skin, particularly when a pulling force is applied to the skin caused by the skin being held back by the slaughtered bird 2 during removal of the first part 4' and second part 4" from the abdominal cavity of the bird 2. In connection therewith, for this exemplary embodiment, it is further preferable that the first vertically movable part 4' is embodied with a central aperture 6, which can best be seen in FIGS. 1A, 2A, and 3A. The second vertically movable part 4" is preferably dimensioned to loosely fit in the central aperture 6 of the first part 4' to provide some play between both movable parts 4', 4", which is sufficient to make the above-mentioned movement of the abdominal skin possible when it is torn at, although it is clamped by the parts 4' and 4". Consistent therewith, FIGS. 1A, 2A, and 3A also show that the first movable part 4' is preferably provided with a wall or walls delimiting an area defining the central aperture 6 of the first movable part 4', wherein FIG. 3A shows that the second vertically movable part 4" then preferably has a closed surface substantially matching the area of the central aperture 6 of the first movable part 4'.

From FIG. 3A it is also clear that the wall 7 or walls of the first movable part 4' and the second vertically movable part 4" together constitute a cup 9 when the second vertically movable part 4" is tilted towards the first vertically movable part 4' to clamp the abdominal skin with the abdominal fat 8 between the parts 4', 4". This cup, constituted by the joint operation of the first movable part 4' and the second vertically movable part 4", is suited to receive the abdominal fat that is present on the abdominal skin as will be clear from FIG. 3C.

The respective appended figures also show that the central aperture 6 of the first vertically movable part 4' has an essentially rectangular shape, and that the second vertically movable part 4" has a corresponding rectangular shape that fits into the central aperture 6. This can be best seen in FIG. 3A although it may also be apparent from FIG. 4A.

All in all the invention provides a device and a method of operation of the device which is obtainable at low cost and which is easy to maintain, wherein the harvesting of abdominal fat from the abdominal skin of a slaughtered bird can be realized in a high production rate and with high yield wherein little if any fat remains behind in the bird.

Although the invention has been discussed in the foregoing with reference to an exemplary embodiment of the device and method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A device for removing abdominal fat from abdominal skin of a slaughtered bird suspended by the legs, comprising:
   a scraping tool comprising
      a first vertically movable part, and
      a second vertically movable part that is tiltable towards the first part,
   wherein the first part and the second part are arranged to execute a concerted operation in an abdominal cavity of the slaughtered bird for removal of the abdominal fat from the bird, wherein the first vertically movable part and the second vertically movable part are arranged to clamp the abdominal skin with the abdominal fat in between the parts, and wherein the device is arranged to remove thereafter the first movable part and the second movable part together from the abdominal cavity of the bird to detach the abdominal fat from the abdominal skin;
   wherein the first movable part and the second movable part are arranged to move in unison out of the abdominal cavity of the bird to detach the abdominal fat from the abdominal skin.

2. The device according to claim 1, wherein the first vertically movable part and the second vertically movable part are arranged to clamp the abdominal skin with the abdominal fat in between the parts to a pre-established limited extent enabling that the abdominal skin still can move relative to the first part and the second part when a pulling force is applied to the skin caused by the skin being held back by the slaughtered bird during removal of the first part and second part from the abdominal cavity.

3. The device according to claim 2, wherein the first vertically movable part includes a central aperture and the second vertically movable part is dimensioned to loosely fit in the central aperture of the first part.

4. The device according to claim 3, wherein the first movable part is provided with a wall or walls delimiting an area defining a central aperture of the first movable part, and the second vertically movable part has a closed surface substantially matching the area of the central aperture of the first movable part.

5. The device according to claim 4, wherein the wall or walls of the first movable part and the second vertically movable part together constitute a cup when the second vertically movable part is tilted towards the first vertically movable part to clamp the abdominal skin with the abdominal fat between the parts so as to receive the abdominal fat in the cup.

6. The device according to claim 5, wherein the central aperture of the first vertically movable part has an essentially rectangular shape, and the second vertically movable part has a corresponding rectangular shape that fits into the central aperture.

7. The device according to claim 6, further comprising a centering and fixing bracket that is vertically movable without tilting capability.

8. A method for removing abdominal fat from abdominal skin of a slaughtered bird suspended by the legs using a scraping tool provided with a first vertically movable part and a second vertically movable part that is tiltable towards the first part, wherein the first part and the second part execute a concerted operation in an abdominal cavity of the slaughtered bird for removal of the abdominal fat on the abdominal skin of the bird, the method comprising:

tilting the second vertically movable part towards the first vertically movable part so as to clamp the abdominal skin with the abdominal fat in between the first part and the second part;

removing the first movable part and the second movable part together in unison from the abdominal cavity of the bird; and detaching the abdominal fat from the abdominal skin.

9. The method according to claim 8, comprising:

clamping the abdominal skin with the abdominal fat in between the first vertically movable part and the second vertically movable part to a pre-established limited extent so as to enable that the abdominal skin moves relative to the first part and the second part when a pulling force is applied to the skin that is caused by the skin being held back by the slaughtered bird during removal of the first part and second part from the abdominal cavity.

10. The method according to 9, wherein the first movable part is provided with a wall or walls delimiting an area defining a central aperture of the first movable part, and wherein the second vertically movable part has a closed surface substantially matching the area of the central aperture of the first movable part, wherein the second vertically movable part is tilted towards the first vertically movable part so that the wall or walls of the first movable part and the second vertically movable part together constitute a cup for receipt of abdominal fat when the abdominal skin with the abdominal fat is clamped between the first and second movable parts.

\* \* \* \* \*